Patented Feb. 8, 1944

2,340,913

UNITED STATES PATENT OFFICE 2,340,913

METHOD OF PREPARING PROLAMINE PLASTIC COMPOSITIONS

Harry M. Weber, Chicago, Ill., assignor to American Maize-Products Company, New York, N. Y., a corporation of Maine No Drawing. Application November 4, 1940, Serial No. 364,297

11 Claims. (Cl. 106—152)

The present invention relates generally to a method of preparing a prolamine plastic composition. It has particular reference to plastic or thermoplastic normally viscous or solid solutions of prolamine, or protein containing prolamine, such as zein, or corn protein containing zein.

This is a continuation in part of my copending application Serial No. 260,112, filed March 6, 1939, and Serial No. 247,367, filed December 23, 1938, the former being a continuation in part of the latter, and the latter being a continuation in part of my prior application Serial No. 124,461, filed February 6, 1937, now abandoned.

In Serial No. 247,367, I disclose the dissolution of zein in shellac by mastication of zein and shellac on hot rolls. Other natural resins or like materials have solubility for zein. This solubility is also exhibited by extracted components of such natural resins, and by derivatives of the natural resins or of their said solvent components. I have also disclosed the use of such resinous materials with and without non-resinous solvent material to make thermoplastic and normally viscous to solid zein solutions.

It is an object of the present invention to prepare solutions containing dissolved zein, in which liquid or solid solvents for zein are used, whether or not natural resin-like materials, components of them, and their derivatives, are included in the solvents for the zein.

It is also an object of the invention to heat, or soften or melt the solvent or solvents employed, particularly any of said resin-like materials, and to dissolve zein in the softened or melted or liquid solvent substance or substances.

It is an object of the invention to use a heated solvent or solvents for zein and to incorporate zein into the solvent or solvents to obtain solutions which are plastic when hot, and which may be cooled to viscous, soft or hard solid solutions, as a base which is readily cut or distended by larger quantities of a liquid solvent or solvent mixture to form viscous to liquid zein solutions.

It is a further object of the invention to incorporate plasticizers, or to use solvent plasticizers for zein, for the resulting solid or viscous solution of the zein, which results from cooling the heated mass obtained in effecting the desired solid solution of zein.

It is a special object of the invention to prepare such solutions of zein which have less than 7 parts of water to 93 parts of zein by weight, such as substantially anhydrous solutions.

It is a further object of the invention to provide a solid soluble base containing protein and natural resins, or components thereof, or their derivatives.

Various other and ancillary objects and advantages of the invention will be understood from the following description and explanation of the invention.

Heretofore, where zein is used to produce solutions, such as viscous printing inks, printing ink base, liquid coating and impregnating compositions, it has been the custom to use dry solid zein and liquid solvent. To make a viscous solution directly, such zein dissolves slowly and with difficulty, often forming lumps, and this is true with some solvents or solvent mixtures where liquid coating compositions are the objective. Many such uses of zein call for resinous ingredients, or plasticizers, or solvent plasticizers, or high-boiling solvents, or some or all of these in various combinations, in addition to easily volatile solvents, or slowly volatile solvents.

The present invention is based upon the discovery that zein may be dissolved to form a solid solution which may be provided as a viscous, soft or hard, thermoplastic solution of high zein content, for use to make more dilute viscous or liquid solutions, with more speed and ease than when using zein in an undissolved state.

According to the present invention zein, or corn protein containing zein, or any other prolamine, or protein containing a prolamine, is used preferably in a finely divided form in a manner exposing it to a homogenizing mixing procedure with solvent material activated if necessary, to exert strong solvent power. For example, rosin, shellac, abietic acid and the like which are normally solids, require an activation by softening or melting by heat, or by distending the same by use of some liquid to produce a plastic or liquid form. This liquid or plastic form of such solid materials, or any normally liquid or plastic solvent for zein, or prolamine, is compounded to homogeneity, whereby a solvent action is exerted on the prolamine to form eventually a solid solution. Masticating rolls or heavy duty mixing equipment are the preferred means for attaining this condition, and they are preferably heated to increase the temperature of the solvent or solvent mixture, and of the plastic solution being formed therewith.

Compositions normally solids when cold may thus be obtained which soften at an elevated temperature. The solution may be formed at an elevated temperature to provide a hot plastic mass which may solidify on cooling. Solids thus obtained may be high in dissolved protein content. Such solids, as lumps, flakes, or powder, with and without heat, may be more readily distended to more dilute solution, from viscous to liquid form, by contact with liquid solvents, than can solid zein. While it is possible to refer to dissolving such solids in a liquid solvent, it is perhaps more proper to refer to cutting the solid solution with a diluent solvent. By this method zein, for example, may be dissolved, by first compounding zein to a solid solution, and then distending the solid solution by use of a liquid solvent.

Whereas my prior applications referred to resins or resinous materials as essential components of the solvent for making a solvent solution, the present invention refers to use of any solvent for prolamine, or a mixture which is solvent for prolamine, whether or not a resin or a resinous material is the solvent material, or a component of a solvent mixture.

The invention is preferably carried out with zein, which is a highly developed protein in the class of prolamines. Consequently, the invention in detail is illustrated by specific reference to zein, with the intent not to limit it to zein, and with the intent that other prolamines may be substituted for the zein.

Possible advantages are in handling, such as reduction in weight for shipping purposes, higher solid content for given purposes, such as printing ink base, thermoplastic adhesives and the like.

When zein is dissolved in shellac on hot rolls, the process is preferably carried out in a short time and at not too high a temperature, owing to a reactivity between the zein and some active components of shellac. This reactivity of shellac resembles that forming many synthetic resins, in that it exerts a thermo-setting action, and produces a hardening, toughening and a lowering of the solubility of the combination product. For this reason where the rolls are heated by 50 lb. steam pressure, the incorporation of zein into shellac is preferably effected in at least 15 minutes. Time may be shortened, or temperature may be lowered by moistening the plastic mass with a solvent, such as 190 proof ethyl alcohol, so-called 95% alcohol, either grain or denatured grain alcohol. A volatile mutual solvent is preferred for this purpose, as this is readily lost.

I have found that the property of dissolving zein is not peculiar to shellac, and that it is possessed by other natural resins, such as rosin, pontianac, elemi, congo, manila, and dammar. I have also found that components of these resins (such as abietic acid from rosin), which are commonly extracted from them for use in commerce, also have this property. And further, I have found that derivatives of the raw resins, and of their components have the same property. Derivatives such as hydrogenated rosin, or the hydrogenated abietic acid component of rosin, or the esters of rosin, or of abietic acid, or of hydrogenated rosin, or of hydrogenated abietic acid exhibit the same solvent power. A methyl or other appropriate ester of abietic acid (said ester being known as Albalyn, made by Hercules Powder Company, Wilmington, Delaware) shows solubility for zein. This is an ester with a monohydric alcohol. Esters with polyhydric alcohols also have the property.

I have also found that there is a tendency for the resin to react with the zein at elevated temperatures. The reaction is slow and does not interfere with a moderately hasty procedure for effecting the solution at temperatures where the solvent resin is plastic or even melted. The zein readily dissolves in such plastic or melted resins, and the solution may be cooled to a setting point without throwing out the protein, the solution being stable at 70° F. against the separation of zein. Thus, in the solidified cooled masses, the resin is in fact a solid solvent of the zein. The product acquires a shellac-like toughness, which is a property that has long been sought for in the field of synthetic resins. The product has solubility in many common solvents, and solutions of it are superior to dissolved shellac for the common uses of shellac. Solutions of it have many uses for which a solution of shellac is not entirely satisfactory. For example, solid solutions of the present invention were dissolved and applied as a varnish. The application dries quickly without tackiness in a shorter period, to a highly adherent and tough coating. This coating may be sanded very soon after completion of the drying and in a much shorter time than a shellac coating. The composition as a solution in a volatile solvent has less penetration, and hence more covering power.

As Example 1, a highly absorptive tissue paper was coated on one side without destroying the absorptive value of the body of the paper, by a mass containing by weight 45 parts of zein, 20 parts of rosin and 25 parts of plasticizer (Santicizer 8) dissolved in 270 parts of commercial denatured alcohol.

Coatings of the solid solutions are comparable in toughness to coatings of non-analogous types, such as cellulose derivative lacquers. The latter are commonly used where toughness is desired, but in many uses the surface exposed lacks desired properties such as printability with oil-base printing inks. Coatings made of the solid solutions of the present invention have such printability. In the same field they have freedom from off-setting. Colored coatings have been used to give a white sheet the appearance of a colored sheet, and then the color-coated sheet may be printed upon the same as a colored uncoated sheet. The coating has also been applied to paper including printed paper or labels, glassine, Cellophane, cardboard, boxboard, with or without color in the coating. Such coatings have also been applied to asphalt impregnated products to render them "bleed-proof" and eliminate any inherent tackiness of such products.

The composition may also be worked up with solvents, to form inks with or without plasticizers, for intaglio printing, screen-stenciling, letterpress, offset, sign-making, painting, and such uses. By the incorporation of inert mineral or fibrous fillers, compositions suitable for thermoplastic molded products can be produced.

The thermoplastic compositions may also be applied directly to paper, wood, fabric, etc., by means of suitable heated rolls. In general, the compositions have the drawback of "stringing" when applied in this manner, resulting in the application of an uneven coating. Hot calendering of such uneven coatings improves the surface materially. The incorporation of minor amounts of volatile solvents or mixed solvents, or softening agents, up to 40% by weight, to the thermoplastic resin protein masses, produces a viscous composition that can be readily applied to surfaces to be coated by means of a "doctor" blade or spreading knife. In this manner, as well as in volatile solvent solution thermoplastic coatings for solids have been produced in which the coating is subsequently used as a heat-sealing adhesive.

As one example of this type of composition, the following is given:

EXAMPLE 2

| | Parts by weight |
|---|---|
| Rosin | 175 |
| Zein | 390 |
| Diethylene glycol or ethylene glycol | 150 |
| Santicizer 8 | 110 |
| 190 proof denatured alcohol (5% methanol) | 175 |
| Titanium dioxide (titanox) | 70 |

The titanox was ground in a pebble mill in the alcohol, thoroughly to wet the pigment and reduce it to the desired fineness, and the product added to a heated mixture of the other ingredients previously mixed in a heavy duty mixer. The resulting viscous solution is stable against separation of zein or gelling at 70° F. It was coated on paper box board, the distribution and thickness of the coating being regulated by an adjustable "doctor" blade or knife and passed through a hot-air chamber to remove the volatile solvent. An opaque, white coating having a high gloss was produced. The viscous solution described may be thinned, if desired, as by use of 190 proof alcohol, grain or denatured.

In carrying out this phase of the invention any solid solvent is heated to soften or melt it. Heating also serves to improve the solvent power of normally liquid or viscous solvents. Finely divided or powdered commercially dry zein is incorporated into the solvent by appropriate mechanical mixing devices. The zein may contain no moisture or considerable moisture, the average commercial material having about 7% water. Where resins or high boiling solvents are used, the water content is largely lost in the process of incorporation, when the temperature employed is near and usually above the boiling point for water. Thus, substantially anhydrous solutions are obtained. If a third agent is present which is a solvent for either or both of the components, the agent assists in the process. Such liquid agents permit use of lower temperatures and the shorter time for the hot dissolution process, and according to its volatility it is lost in the process. For example, where 190 proof ethyl alcohol (grain or denatured) is used in a quantity up to 20% of the total solids of shellac and zein, the process of incorporation may be carried out with a lessened thermo-setting reaction between the shellac and zein. On steam rolls (heated by 50 lb. steam pressure) the mutual incorporation may be completed in from 10 to 15 minutes, during which time the thermal-setting property is not expended. Thus, within this, and within longer times, a plastic mixture may be taken from the rolls, preferably in sheet form, and cooled, which mixture is subject to thermo-setting on further heating for a prolonged period. Where a medium boiling solvent is used, such as one of the "Cellosolves," it will remain longer in the mass.

The Cellosolves are monoalkyl ethers of ethylene glycol, in which the alkyl group may be methyl, ethyl, propyl, or butyl. Where it is ethyl, the product is referred to merely as "Cellosolve" as the trade mark of Carbide and Carbon Chemical Corporation.

Other high-boiling solvents are the "Carbitols" which are the mono-alkyl ethers of diethylene glycol. The trade marked product "Carbitol" is the mono-ethyl ether of diethylene glycol, but the methyl, propyl and higher homologs are also contemplated.

Other high-boiling solvents are ethylene glycol, propylene glycol, diethylene glycol and triethylene glycol. These glycols and their mono-alkyl ethers are all equivalent high-boiling solvents for the present invention, and it is to be understood that where any one of them is given in a formula, each of the others may be substituted in the formula in the same quantity without material change in character of the resulting product.

Any of the solvent resinous materials may be used exactly like shellac, with or without an added agent, such as volatile solvent, or non-volatile solvent or a permanent plasticizer, which may be a solvent for the resin element or the zein, or for both. When plasticizer is used the cooled composition may be less rigid, and even flexible, or rubbery. A cold rubbery mass A is formed by a composition having by weight 4 parts of rosin, 4 parts zein, 1 part Santicizer 8, and 1½ parts of ethylene glycol. These two plasticisers are solvent plasticizers for the rosin and the zein.

A hard tough resilient mass B, rigid when cold, is formed by 4 parts by weight rosin, 4 parts of zein, 1 part of dibutyl tartrate, and 1 part of ethylene glycol, or its equivalents above named. Thus it will be seen that the properties are greatly affected by the choice and proportion of plasticizer. The solid product may be cut by 190 proof denatured alcohol, such as 5% methanol-denatured, to form stable solutions at 70° F., which are non-gelling.

A tough mass C, resilient and pliable when cold, is formed by 2 parts by weight of rosin, 2 parts of zein, 1 part of dibutyl tartrate, 1 part of ethylene glycol, or its equivalents above named. Each of the masses of the above examples were incorporated together at 250° F. in about 2 hours in a Baker Perkins mixer. The same effect on hot rolls can be obtained in about 20 minutes. The solid product may be cut by 190 proof denatured alcohol, such as 5% methanol-denatured, to form stable solutions at 70° F., which are non-gelling.

A hard tough solid D is formed from 40 parts by weight of zein and 35 parts of ester gum. Ester gum is a partially reacted product of glycerine (a polyhydric alcohol) and the abietic acid content of wood rosin, and is commonly referred to as a glyceride of abietic acid, the latter being a mono-basic organic acid. The ester gum of commerce has a measurable acid number, showing it to be an incompletely reacted ester. This composition D makes an excellent printing ink with 400 to 700 parts 190 proof ethyl alcohol (grain or denatured), for intaglio printing. A distender may be used as set forth below. The solid product may be cut by 190 proof denatured alcohol, such as 5% methanol-denatured, to form stable solutions at 70° F., which are non-gelling, such as the said printing ink from composition D.

With only the resinous solvent and the zein, up to 75% of the mass may be zein without much difficulty in the mechanical procedure. However 60% is the preferred safe limit for the process in general. In any case where there is encountered some difficulty in getting the zein properly incorporated, the addition of an agent such as ethylene glycol, diethylene glycol, ethyl alcohol, Cellosolve or its equivalents named above, or a plasticizer, as dibutyl tartrate or Santicizer 8, whether solvent or non-solvent, serves to distend the mass and ease the process. Where the agent is a solvent for one or the other, or for both, its effect is more marked, and in such case the zein and the resinous ingredient may be mutually combined in all proportions. Thus, in making the formula of Example 2, the rosin and the zein, the zein being about 69% of the rosin and zein, may be incorporated together more readily by adding a little solvent such as Cellosolve, for example 100 parts to the formula, without losing the stability of the solution.

There is some evidence that a thermal reaction takes place between rosin and zein, but it is not as extensive as in the case of shellac and zein. The latter two can react to form a thermo-rigid body, but with rosin and zein the product is thermoplastic under the conditions which produce such thermorigidity.

Just as the resinous solvents exert a solvent action on zein, so do many non-resinous materials, such as the Cellosolves, the Carbitols, the alkylene glycols, and other high boiling organic solvents, and also certain solvent plasticizers, such as the aromatic alkylated sulfonamides, of which Santicizer 8 is the toluene sulfonamide, others being set forth in Hansen Patent No. 2,115,716.

Any of the known solvents for zein or prolamine, or solvent plasticizers, which are not readily volatile, may be mixed with dry zein, heated and masticated or otherwise homogenized to exert the solvent power on the protein. However, it is preferred that resin or resinous material also be present, because as a general rule a mixed solvent for zein has more solvent power than corresponds to the sum of the solvent powers of the separate ingredients. Consequently the preferred examples of the present invention involve a resinous ingredient, not only to improve solvent power, but also to give desired properties, such as adhesiveness, to the zein or prolamine base of the composition.

However, whether or not a thermal reaction takes place, when using a resin, the invention may be practiced. Where a thermal reaction does take place in the process of carrying out the invention, as in the case of forming a thermorigid body with shellac and zein, the process is carried out under conditions chosen to effect the incorporation without the thermal reaction preventing the operations.

Any of the solid or viscous compositions, such as masses A, B, C, or D, given above, may be distended to a viscous or liquid coating solution, and applied as a coating solution to paper, plies of wood, or fabric for lamination with heat. Solid sheets of the thermoplastic composition may be inserted between two sheets to be united, and heat applied to the assembly. Paper such as glassine, or synthetic sheets such as regenerated cellulose, or cellulose acetate, may be so united.

In making coating solutions, whether liquid or viscous, a volatile solvent, such as 190 proof grain or denatured alcohol, or more anhydrous solvent or solvent mixture may be added to the thermally produced solid solutions above described. The solvent readily cuts the protein solution already present so that on standing or by applying heat, the solid substance goes smoothly into a new and diluted solution without danger of lumping or other difficulty. One great advantage of this procedure is in the production of a solution having a high content of zein with a minimum of aquosity. Considering that commercial zein contains about 7% of water, the use of 95% ethyl alcohol as a major solvent for commercial zein, brings into the solution not only the water of the dry zein, but also the water of the alcohol.

By incorporating such "dry" zein with some high-boiling or non-volatile solvent, at elevated temperature, to form a solid solution under conditions which drive away all or much of the water content of the commercial zein, there is obtained a substantially anhydrous solid solution of zein. To this the addition of 95% ethyl alcohol or 95% non-aqueous solvents of different character, assures that the final solution has less water than if the same solvents and commercial zein were incorporated together by simple procedures of mixing until dissolved.

The invention is not limited to a kinetic procedure, as above described, for producing solid solutions of zein and a normally solid solvent therefor. This is merely a mechanical way of securing intimate contact between the elements of the mixture. A static procedure may be employed. For example, a thin film of rosin, shellac, or other solid which dissolves zein, may receive a zein coat deposited from a zein solution. This in turn may receive a rosin coat, or a coat of the solid used, and so on. A built-up mass of laminated zein and rosin, or other solid, may be heated to secure the desired solution, and this may be done under conditions to permit evaporation of any included water.

Another static procedure is to dissolve or suspend one element in a solution or suspension of the other, such as suspending rosin in a solution of zein in a solvent incapable of dissolving rosin, or emulsifying the resin and the zein in a common vehicle. Such a mass is freed from solvent or liquid and the residue heated. By baking at 50° C. for 2 hours a deposit of rosin and zein from a common solution of them in an ethyl or like alcohol, preferably 190 proof, the baked film showed a much greater resistance to spotting with water than an unbaked film, indicating a change in the structure by the thermal action. This is either a change to solid solution of the zein in rosin effected by heat, or else it is the creation of a new product by a reaction of rosin and zein under the influence of heat, or it may be loss of residual water. The heat effects a new condition not heretofore presented by the composite film formed by evaporating a mutual solution of the two ingredients. The solution may also contain plasticizers or high boiling solvent materials, like the heat-masticated composition.

In this specification and in the following examples where "95% alcohol" is used, it is intended that this may be 190 proof grain (ethyl) alcohol, or 190 proof denatured alcohol. Denatured alcohol is intended to mean ethyl alcohol denatured according to any of the standard government formulas, and any of the common commercial formulas. Some of these are compounded as follows, and are identified by the terms commonly used in trade.

S. D. No. 1 (authorized composition)

To 100 gallons of 95% (by volume) ethyl alcohol, add 5 gallons of approved wood (methyl) alcohol (95% by volume).

Resultant volume at 60° F., 105.1 gallons.

Solox or Shellacol (authorized composition)

Solox is manufactured by U. S. Industrial Chemicals, Inc., New York city, N. Y., and Shellacol is manufactured by Commercial Solvents Corporation, Terre Haute, Ind.

To 100 gallons of S. D. No. 1, add:

Ethyl acetate _____ gallons__ 5
Aviation gasoline _____ do____ 1

Resultant volume at 60° F., 106.0 gallons.

Zein solutions in alcohol and like solvents, but without rosin or other natural or synthetic resins, are subject to varying life as to their stability at 70° F. They may slowly gel. I have found that when these solutions are changed by including rosin, or natural or synthetic resins, they have increased stability. Lactic acid is an ingredient acting like resins for such function.

Therefore, the combination of resin and zein in the form of solid solutions according to the present invention affords a form of zein adapted for making zein solutions of high stability.

The following useful compositions may be made directly from the ingredients by heating if required, but preferably by using the zein content of the formula with one or more of the resins, plasticizers, or high-boiling solvent components, to form viscous or solid solutions, and then cutting the solutions with the more liquid element or mixture from the formula. Where the viscous or solid solutions are made in the manner herein described, temperatures at or above 212° F. are preferred in order to remove water, particularly that accompanying commercial zein, to make solutions of lower aquosity.

Example 3

| | Parts by weight |
|---|---|
| Zein | 40 |
| Shellacol | 200 |
| Resyl 132-3 | 20 |
| Carbitol | 0.5 |
| Lactic acid (100%) | 4 to 10 |

The lactic acid has been used as a 50% solution, and as an 85% solution in water, the common commercial grades. Resyl 132-3 is an alkyd resin made by American Cyanamid Company. The above composition is non-gelling and stable against separation of zein at 70° F.

Example 4

| | | |
|---|---|---|
| Zein | lbs__ | 2 |
| Rosin | lbs__ | 2 |
| Shellacol | gal__ | 1 |
| Benzol | pint__ | 1 |

The above composition is non-gelling and stable against separation of zein at 70° F. It has been used successfully as a priming coat for furniture.

Example 5

| | Parts by weight |
|---|---|
| Zein | 4 |
| Denatured alcohol (including methanol) | 40 |
| Santicizer 8[1] | 1 |
| Ethlyene glycol | 1 |
| Rosin | 4 |

[1] A mixture of ortho- and para-toluene sulfonamides made by Monsanto Chemical Company, St. Louis, Missouri.

The above solution is non-gelling and stable against separation of zein at 70° F.

Example 6

| | Parts by weight |
|---|---|
| Zein | 390 |
| Shellacol | 175 |
| Diethylene glycol | 150 |
| Rosin | 175 |

The above solution is non-gelling and stable against separation of zein at 70° F.

Example 7

| | Parts by weight |
|---|---|
| Zein | 10 |
| Shellacol | 50 |
| Lactic acid (85%) | 2 |

The above solution is stable and non-gelling at 70° F., and makes an excellent glaze coating for candy. If caustic soda is added in quantity to neutralize part or all of the lactic acid, sodium lactate is formed which serves as a plasticizer for the zein.

Example 8

| | Parts by weight |
|---|---|
| Zein | 10 |
| Rosin | 10 |
| Ethylene glycol | 2 |
| One of the following: | |
| (a) Dibutyl tartrate | 2 |
| (b) Santicizer 8 | 2 |

The above formulation is incorporated by heat to form a solid solution, which is slightly plastic when cold, and capable of being sheeted, and is self-adhesive at summer temperatures. This solid has been taken up in 95% alcohol (grain or denatured) in varying quantities. In the form of a 25% solution of solids, these solutions have been used to coat paper, and printed paper. The solid solutions above described were held for about one year, and then dissolved in alcohol for the said coating of paper, making clear solutions which are stable and non-gelling at 70° F.

Example 9

| | Parts by weight |
|---|---|
| Zein | 20 |
| Denatured alcohol such as Shellacol | 80 |
| Methyl Cellosolve | 0.2 |

The above solution is substantially non-gelling and stable at 70° F. for coating paper, and other surfaces.

Example 10

| | Parts by weight |
|---|---|
| Zein | 20 |
| Denatured alcohol | 140 |
| Benzol | 20 |
| Gum mastic | 20 |

The above solution is non-gelling and stable at 70° F.

Example 11

| | Parts by weight |
|---|---|
| Zein | 50 |
| Absolute ethyl alcohol | 210 |
| Water | 10 |
| Dibutyl tartrate | 25 |

The above solution is non-gelling and stable at 70° F.

Example 12

| | Parts by weight |
|---|---|
| Zein | 15 |
| Denatured alcohol | 95 |
| Dibtuyl tartrate | 8 |
| Copal gum | 40 |

The above solution is non-gelling and stable at 70° F.

Example 13

| | Parts by weight |
|---|---|
| Zein | 30 |
| Denatured alcohol | 140 |
| Shellac | 30 |

The above solution is non-gelling and stable at 70° F.

EXAMPLE 14

| | Parts by weight |
|---|---|
| Zein | 9 |
| Denatured alcohol | 30.3 |
| Dibutyl tartrate | 5 |
| Shellac | 40 |

The above solution is non-gelling and stable at 70° F., and has been used to coat and to laminate glassine paper.

EXAMPLE 15

| | Parts by weight |
|---|---|
| Zein | 10.8 |
| Denatured alcohol | 34 |
| Dibutyl tartrate | 6 |
| Shellac (refined) | 4.8 |

The above may be quickly dissolved by heating to 40° C., or allowed to stand until dissolved. The rapid hot mastication of the ingredients minus most of the alcohol may also be practiced to form a solid solution. The total formula forms a solution which is non-gelling and stable at 70° F.

EXAMPLE 16

| | Parts by weight |
|---|---|
| Zein | 1 |
| Denatured alcohol | 4.6 |
| Rosin | 1 |
| One of the following: | |
| (a) Dibutyl tartrate | .2 to .4 |
| (b) Bodied castor oil | .1 |
| Dibutyl tartrate | .2 |
| (c) Bodied castor oil | .1 |
| Dibutyl tartrate | .4 |
| (d) Bodied castor oil | .1 |

All of the above solutions are stable and non-gelling at 70° F., and have been used to coat paper. The coated paper was dried at 80° to 85° C.

EXAMPLE 17

| | Parts by weight |
|---|---|
| Zein | 20 |
| Rosin | 20 |
| Santicizer 8 | 5 |
| Ethylene glycol | 5 |

The materials are incorporated by heat to form a solid solution which is stable at 70° F.

EXAMPLE 18

| | Parts by weight |
|---|---|
| Zein | 5 |
| Rosin | 3 |
| Denatured alcohol | 4 |
| Santicizer 8 | 1 |
| Ethylene propylene glycol | 1 |

The above ingredients were incorporated thermoplastically to form a viscous solution non-gelling and stable at 70° F. It was used on hot rolls to coat paper. The above solution has been modified by adding thereto 0.12 to 0.24 parts of paraffin wax.

EXAMPLE 19

| | Parts by weight |
|---|---|
| Zein | 4 |
| Rosin | 4 |
| Santicizer 8 | 1 |
| Ethylene glycol | 1.5 |

The above were incorporated thermoplastically to form thermoplastic solid, which is stable at 70° F. Coated on paper by hot rolls, the coating is somewhat tacky. From 0.12 to 0.24 parts of paraffin wax has also been added to the formulation.

EXAMPLE 20

| | Parts by weight |
|---|---|
| Zein | 40 |
| Denatured alcohol | 88 |
| Copal gums | 54 |
| Sulfonated olive oil | 15 |

The above is a liquid coating solution which is non-gelling and stable at 70° F., and has been used to coat paper.

EXAMPLE 21

| | Parts by weight |
|---|---|
| Zein | 45 |
| Shellac | 20 |
| Dibutyl tartrate | 25–35 |
| Denatured alcohol | 260 |

The above forms a limpid solution suitable for a printing ink base. It is non-gelling and stable at 70° F.

EXAMPLE 22

| | | |
|---|---|---|
| Zein | lbs | 5 |
| Rosin | lbs | 5 |
| Denatured alcohol | gals | 5 |

The above forms a good solution for a single-coat finish on wood. It is stable and non-gelling at 70° F.

EXAMPLE 23

| | Parts by weight |
|---|---|
| Zein | 25 |
| Denatured alcohol | 50 |
| Dibutyl tartrate | 1.25 |
| Dibutyl phthalate | 5 |

The above forms a liquid solution stable and non-gelling at 70° F.

EXAMPLE 24

| | | |
|---|---|---|
| Zein | lbs | 25 |
| Rosin | lbs | 25 |
| Denatured alcohol | gals | 10 |

The above solution is stable and non-gelling at 70° F.

EXAMPLE 25

| | Parts by weight |
|---|---|
| Zein | 40 |
| Rosin | 30 |
| Ethylene glycol | 15 |
| Santicizer 8 | 8 |
| Denatured alcohol | 200 to 300 |

The above solution is stable and non-gelling at 70° F., and is used at a dilution, suitable for operation on coating rolls, preferably at about 25% solids.

EXAMPLE 26

| | Parts by weight |
|---|---|
| Zein | 35 |
| Dibutyl tartrate | 30 |
| Ester gum (alcohol soluble) | 40 |
| Denatured alcohol | 400 |

The above solution is non-gelling and stable at 70° F., and has been used in coating tin and paper.

EXAMPLE 27

This is disclosed in my earlier application Serial No. 124,461. An excellent substitute for ordinary shellac is made as follows:

| | | Case 1 | Case 2 |
|---|---|---|---|
| Solvent | gallons | 1 | 1 |
| Zein | pounds | .75 | 2 |
| Shellac | do | .75 | 2 |
| Plasticizer | do | .18 | 0.8 |
| Fillers, color, pigment | | (¹) | (¹) |

¹ Optional.

The solvent may be 95% ethyl alcohol, 95% alcohol having 5% methanol as denaturant, 95% iso-propyl alcohol, or 95% mono-ethyl ether of ethylene glycol. The zein may have from 0 to about 7% moisture, the latter being commercial zein. The plasticizer may be dibutyl tartrate, Santicizer 8, tricresyl phosphate, dibutyl tartrate, triacetin, aromatic and aliphatic sulfonamides (including Santicizer 8), and other well known ones commonly used in shellac, prolamine-base compositions, or other base compositions which are commonly deposited from volatile organic solvents, such as lacquers.

Solutions according to this example are stable against separation of zein and non-gelling at 70° F.

The shellac, zein and plasticizer may be incorporated together by heat to form a solid solution, and at elevated temperatures, such as at 212° F. or higher water from commercial zein will be lost. Or the zein may be dissolved in about two-thirds of the alcohol, and the shellac in the remainder. Plasticizer may be added to either or both such separate solutions, or to the two solutions after combining. Denatured alcohol or other solvents for the formula, and many others, may be added to dilute the solution.

The coating composition as given, or as diluted, has been applied as a priming coat to natural wood, such as furniture, to be finished with paint, varnish, lacquer or more of the same priming composition. It may be used to coat or impregnate paper, cardboard, printed paper or cardboard, cloth, shaped material entering into shoes, hats, coats, furniture and the like, book-backs, paper book-jackets or covers, magazine covers, advertising sheets, labels and the like.

The solution is ideal for use on printed paper sheets used as protective jackets for the fly-covers of books. These are usually printed on one day and shellac-coated on the next. Oxidation of oils in certain printing inks often creates heat in stacks of shellacked printed sheets and this frequently causes sticking within the stack. Use of the above compositions prevents such sticking. Heat hardens the coat.

EXAMPLE 28

| | Parts by weight |
|---|---|
| Zein | 23 |
| Absolute ethyl alcohol | 55 |
| Toluene | 24 |
| "Cellosolve" | 21 |
| Rosin | 10 |

The same solvent composition has been used to dilute the above formula to coat paper.

The above and the diluted solutions are stable and non-gelling at 70° F.

EXAMPLE 29

This solvent is disclosed in my application Serial No. 247,367.

| | Parts by weight |
|---|---|
| Zein | 23 |
| Absolute methyl alcohol | 70 |
| Toluene | 30 |
| Rosin | 10 |

The same solvent composition has been used to dilute the above formula to coat paper.

The above and the diluted solutions are stable and non-gelling at 70° F.

In all of the foregoing examples it is to be understood that where the zein is made up to solid or viscous solution thermoplastically, each of the formulas may be modified by the use of distenders as above named, and the equivalents thereof above named. Therefore, each formulation is to be read and is considered as given herein, with such modification, the amount used for distending being small for the purpose, as required, relatively to the total formulation.

The various modifications suggested, and others, are contemplated as falling within the scope of the appended claims.

I claim:

1. The method of producing a substantially anhydrous solution of zein which comprises homogenizing commercially dry zein having about 7% by weight of water at an elevated temperature above the boiling point of water with a substantially anhydrous organic material which is a solvent for zein at the temperature so employed, which material is characterized by fluidity at said temperature and which is further characterized by the ability to retain said fluidity against boiling at the temperature so employed, and permitting substantially all the water content of the zein to evaporate from the resulting mixture during said homogenizing, the relative quantities of said zein and said solvent material being such as to provide a substantially anhydrous plastic mass at the temperature so employed which mass on cooling to normal temperature provides a substantially anhydrous thermoplastic non-liquid solution of zein.

2. The method of producing a solution of zein which comprises homogenizing commercially dry zein having about 7% by weight of water at an elevated temperature above the boiling point of water with a substantially anhydrous organic material which is a solvent for zein at the temperature so employed, which material is characterized by fluidity at said temperature and which is further characterized by the ability to retain said fluidity against boiling at the temperature so employed, and permitting water to evaporate from the mass during said homogenizing, the relative quantities of said zein and said solvent material being such as to provide a plastic mass at the temperature so employed which mass on cooling to normal temperature provides a thermoplastic non-liquid solution of zein having proportionately to zein less water than the original form of zein employed, which latter solution is readily distendable by contact with normally liquid solvent for zein to form a liquid zein solution of less water content than is obtainable by direct solution of said original zein in the same ultimate solvent ingredients, and cooling said plastic mass to provide said non-liquid solution.

3. The method of producing a substantially anhydrous solution of prolamine which comprises homogenizing commercially dry prolamine having about 7% by weight of water at an elevated temperature above the boiling point of water with a substantially anhydrous organic material which is a solvent for prolamine at the temperature so employed, which material is characterized by fluidity at said temperature and which is further characterized by the ability to retain said fluidity against boiling at the temperature so employed, and permitting substantially all the water content of the prolamine to evaporate from the resulting mixture during said homogenizing, the relative quantities of said prolamine and said solvent material being such as to provide a substantially anhydrous plastic mass at the temperature so employed which mass on cooling to normal temperature provides a substantially anhydrous thermoplastic non-liquid solution of prolamine.

4. The method of producing a solution of prolamine which comprises homogenizing commercially dry prolamine having about 7% by weight of water at an elevated temperature above the boiling point of water with a substantially anhydrous organic material which is a solvent for prolamine at the temperature so employed, which material is characterized by fluidity at said temperature and which is further characterized by the ability to retain said fluidity against boiling at the temperature so employed, and permitting water to evaporate from the mass during said homogenizing, the relative quantities of said prolamine and said solvent material being such as to provide a plastic mass at the temperature so employed which mass on cooling to normal temperature provides a thermoplastic non-liquid solution of prolamine having proportionately to prolamine less water than the original form of prolamine employed, which latter solution is readily distendable by contact with normally liquid solvent for prolamine to form a liquid prolamine solution of less water content than is obtainable by direct solution of said original prolamine in the same ultimate solvent ingredients, and cooling said plastic mass to provide said non-liquid solution.

5. The method of producing a solid solution of prolamine which comprises homogenizing moisture-containing prolamine having at least 7 parts by weight of water to 93 parts by weight of prolamine at an elevated temperature above the boiling point of water with a substantially anhydrous organic material which is a solvent for said prolamine at the temperature so employed, which material is characterized by fluidity at the temperature so employed and which is further characterized by the ability to retain said fluidity against boiling at the temperature so employed, and permitting water to evaporate from the resulting mass to provide less than 7 parts by weight of water in said mass to 93 parts of prolamine during said homogenizing, the relative quantities of said prolamine and said solvent material being such as to provide a plastic mass at the temperature so employed which mass on cooling to normal temperature provides a thermoplastic non-liquid prolamine solution.

6. The process of claim 5 in which the solvent material includes rosin.

7. The process of claim 5 followed by distending the resulting thermoplastic prolamine mass in a substantially anhydrous normally liquid solvent for prolamine in quantity to provide a normally liquid solution of prolamine.

8. The process of claim 1 followed by distending the resulting zein mass in a substantially anhydrous normally liquid solvent for zein in quantity to provide a substantially anhydrous normally liquid solution of zein.

9. The method of producing a solid solution of zein which comprises homogenizing moisture-containing zein having at least 7 parts by weight of water to 93 parts by weight of zein at an elevated temperature above the boiling point of water with a substantially anhydrous organic material which is a solvent for said zein at the temperature so employed, which material is characterized by fluidity at the temperature so employed and which is further characterized by the ability to retain said fluidity against boiling at the temperature so employed, and permitting water to evaporate from the resulting mass to provide less than 7 parts by weight of water in said mass to 93 parts of zein during said homogenizing, the relative quantities of said zein and said solvent material being such as to provide a plastic mass at the temperature so employed which mass on cooling to normal temperature provides a thermoplastic non-liquid zein solution.

10. The process of claim 9 in which the solvent material includes rosin.

11. The process of claim 9 followed by distending the resulting zein mass in a substantially anhydrous normally liquid solvent for zein in quantity to provide a normally liquid solution of zein.

HARRY M. WEBER.